(12) United States Patent
Guo

(10) Patent No.: US 10,929,460 B2
(45) Date of Patent: Feb. 23, 2021

(54) METHOD AND APPARATUS FOR STORING RESOURCE AND ELECTRONIC DEVICE

(71) Applicant: BEIJING KINGSOFT INTERNET SECURITY SOFTWARE CO., LTD., Beijing (CN)

(72) Inventor: Zhenlong Guo, Beijing (CN)

(*) Notice: Subject to any disclaimer, the term of this patent is extended or adjusted under 35 U.S.C. 154(b) by 167 days.

(21) Appl. No.: 16/054,530

(22) Filed: Aug. 3, 2018

(65) Prior Publication Data

US 2018/0373736 A1 Dec. 27, 2018

Related U.S. Application Data

(63) Continuation of application No. PCT/CN2016/109712, filed on Dec. 13, 2016.

(30) Foreign Application Priority Data

Feb. 17, 2016 (CN) .......................... 201610090277.7

(51) Int. Cl.
*G06K 9/54* (2006.01)
*G06K 9/60* (2006.01)
*G06F 16/50* (2019.01)
*G06F 11/14* (2006.01)
*H04L 29/08* (2006.01)

(52) U.S. Cl.
CPC .......... *G06F 16/50* (2019.01); *G06F 11/1448* (2013.01); *H04L 67/1097* (2013.01); *G06F 11/1464* (2013.01); *G06F 2201/81* (2013.01)

(58) Field of Classification Search
None
See application file for complete search history.

(56) References Cited

U.S. PATENT DOCUMENTS

2013/0262410 A1* 10/2013 Liu ...................... G06F 16/116
707/693

FOREIGN PATENT DOCUMENTS

| CN | 103458016 A | 12/2013 |
| CN | 104468774 A | 3/2015 |
| CN | 105760490 A | 7/2016 |
| CN | 105931187 A | 9/2016 |

OTHER PUBLICATIONS

Brachmann et al. ("Automatic Movie Trailer Generation Based on Semantic Video Patterns", Digital Tools in Media Studies. Analysis and Research. An Overview. Bielefeld: transcript 2009). (Year: 2009).*

(Continued)

*Primary Examiner* — Randolph I Chu
(74) *Attorney, Agent, or Firm* — Osha Bergman Watanabe & Burton LLP

(57) ABSTRACT

A method and an apparatus for storing a resource and an electronic device are provided. The method includes: extracting a resource with a storage size exceeding a preset capacity threshold, and backing up the extracted resource to a cloud server; obtaining link address information of the resource backed up to the cloud server; performing a clip processing on the extracted resource, and encapsulating the link address information corresponding to the extracted resource into the clip-processed resource; and replacing the extracted resource stored in an electronic device with the encapsulated resource.

19 Claims, 4 Drawing Sheets

(56) References Cited

OTHER PUBLICATIONS

Wenzlawowicz et al. "Semantic Video Abstracting: Automatic Generation of Movie Trailers Based on Video Patterns" pp. 345-352, 2012. Springer-Verlag Berlin Heidelberg 2012 (Year: 2012).*
International Search Report issued in corresponding International Application No. PCT/CN2016/109712 dated Mar. 1, 2017, and English translation thereof (4 pages).

* cited by examiner

METHOD AND APPARATUS FOR STORING RESOURCE AND ELECTRONIC DEVICE

CROSS REFERENCE TO RELATED APPLICATION

This application is a continuation of International Application PCT/CN2016/109712, which claims a priority to Chinese Patent Application No. 201610090277.7, titled with "method and apparatus for storing resource and electronic device" and filed on Feb. 17, 2016 by BEIJING KINGSOFT INTERNET SECURITY SOFTWARE CO., LTD., the entire content of both of which are incorporated herein by reference.

TECHNICAL FIELD

The present disclosure relates to computer information storage technologies, and more particularly, to a method and an apparatus for storing a resource, and an electronic device.

BACKGROUND

As the development of computer communication and Internet technologies, electronic devices have become more and more popular. For example, smart mobile phones, personal digital assistants, handheld computers and notebook computers have used widely. Also, applications (APPs) installed in electronic devices and functions provided by electronic devices have become more and more abundant. For example, a user may take pictures (photos) and/or capture videos by a camera built in or externally in an electronic device and store them in the electronic device anytime, anywhere. For another example, the user may connect the electronic device to mobile Internet, and downloads video resources such as movies, animations and TV dramas from a network-side server through the mobile Internet and stores them in a local storage. When it is necessary to browse pictures and/or videos, the stored pictures and/or videos are played through a video player to meet personalized needs of the user.

However, typically, based on hard disk storage technologies and production cost, a storage space of the electronic device is generally limited, especially a mobile electronic device. Pictures and/or videos captured or downloaded from the mobile Internet generally require a larger part of the storage space. For example, for a video with a long duration, it requires to occupy a larger part of the storage space of the electronic device. When storing a large-capacity resource such as pictures and/or videos, the method for storing a resource in the related art may easily lead to an insufficient storage space of the electronic device, such that the number of resources that may be stored is smaller and the resource storage efficiency is lower. When enhancing the storage space of the electronic device to store the resources, a storage medium such as a disk needs to be added, such that the usage cost is higher, thereby reducing the user experience.

SUMMARY

As a first aspect, embodiments of the present disclosure provide a method for storing a resource. The method includes:

extracting a resource with a storage size exceeding a preset capacity threshold, and backing up the extracted resource to a cloud server;

obtaining link address information of the resource backed up to the cloud server;

performing a clip processing on the extracted resource, and encapsulating the link address information corresponding to the extracted resource into the clip-processed resource; and replacing the extracted resource stored in an electronic device with the encapsulated resource.

As a second aspect, embodiments of the present disclosure provide an electronic device. The electronic device includes a housing, a processor, a memory, a circuit board and a power supply circuit. The circuit board is disposed inside a space enclosed by the housing, and the processor and the memory are disposed in the circuit board; the power supply circuit is configured to supply power to each circuit or device of the electronic device; the memory is configured to store executable program codes; the processor is configured to execute programs corresponding to the executable program codes by reading the executable program codes stored in the memory to implement the following acts:

extracting a resource with a storage size exceeding a preset capacity threshold, and backing up the extracted resource to a cloud server;

obtaining link address information of the resource backed up to the cloud server;

performing a clip processing on the extracted resource, and encapsulating the link address information corresponding to the extracted resource into the clip-processed resource; and replacing the extracted resource stored in an electronic device with the encapsulated resource.

As a third aspect, embodiments of the present disclosure provide a storage medium having stored an application configured to implement the method according to embodiments of the present disclosure.

BRIEF DESCRIPTION OF THE DRAWINGS

To clearly illustrate embodiments of the present disclosure or technical solutions in the prior art, a brief description of drawings used in embodiments or in the prior art descriptions is given below. Obviously, the drawings in the following descriptions are only part embodiments of the present disclosure, and for those skilled in the art, other drawings can be obtained according to these drawings without creative labor.

DETAILED DESCRIPTION

The embodiments of the present disclosure will be described in detail below with reference to the drawings.

It should be understood that the described embodiments are only a part of the embodiments of the present disclosure, and not all embodiments. All other embodiments obtained by those skilled in the art based on the embodiments of the present disclosure without creative labor are within the scope of the present disclosure.

Figure 1:
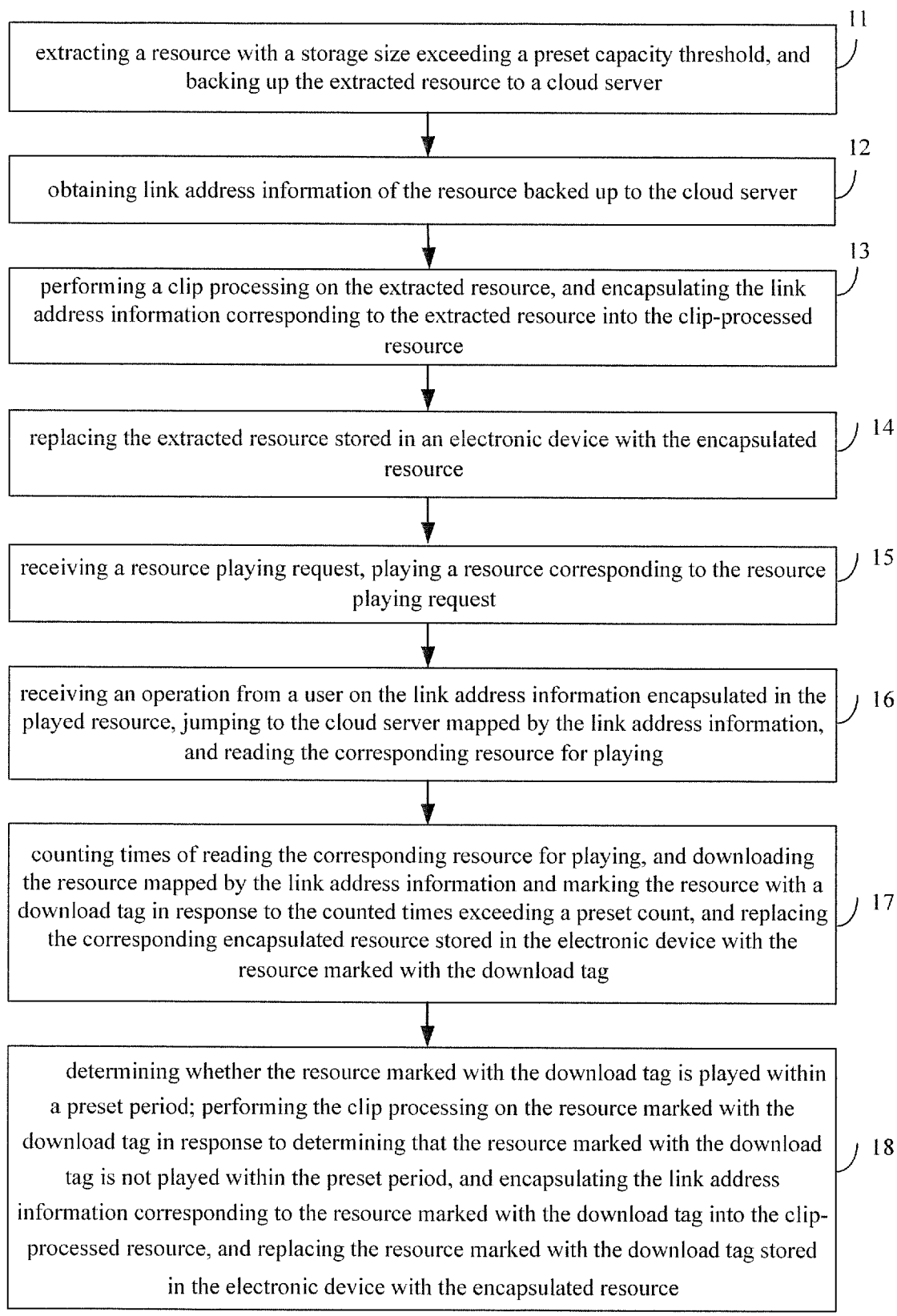
FIG. 1 is a flow chart of a method for storing a resource according to an embodiment of the present disclosure.

FIG. 1 is a flow chart of a method for storing a resource according to an embodiment of the present disclosure. As illustrated in FIG. 1, the method includes the following.

At act 11, a resource with a storage size exceeding a preset capacity threshold is extracted, and the extracted resource is backed up to a cloud server.

In the act, the capacity threshold may be set according to actual needs of the user, for example, 10 M (Megabytes), 20 M, 50 M, 80 M, which is not limited in one or more embodiments of the present disclosure.

In one or more embodiments of the present disclosure, each application operator provides various extended application function services, to improve the application function experience of the user and attract the user to participate in and use the application function. For example, for a limited storage space of an electronic device, a cloud storage service is provided to reduce the cost of purchasing a storage medium for a user to increase the storage space of the electronic device. The cloud storage service is an online storage mode. By virtualization technologies, a plurality of storage servers is configured as a storage pool and the storage pool is placed in the network cloud, such that the user and/or enterprise with storage requirements may use one or more virtual storage servers in the storage pool through subscription mode without purchasing additional storage media. The cloud server guides the user to store data by providing a web application programming interface (API) or providing a web-based user interface.

In one or more embodiments of the present disclosure, the cloud server is used to remotely back up a large-capacity resource stored in the electronic device, to reduce the cost of adding the storage medium such as a disk for the user.

In one or more embodiments of the present disclosure, the resources may include, but be not limited to, pictures, audios, videos, texts, and the like. The picture format may be a bitmap (BMP) format, or a joint photographic experts group (JPEG) format, or a graphics interchange format (GIF). The video format may be a real media (RM) format, or an audio video interleaved (AVI) format, which is not limited in one or more embodiments of the present disclosure.

Preferably, in one or more embodiments of the present disclosure, the resource is a video.

In an embodiment of the present disclosure, as an alternative or additional embodiment, to enhance the security of the resource storage in the cloud server, and to prevent the resource from being illegally accessed, the method may further include the following.

The extracted resource is encrypted.

As another alternative or additional embodiment, to enhance the security during the resource transmission, the method may further include the following.

The extracted resource is transmitted using a secure sockets layer (SSL) protocol.

In one or more embodiments of the present disclosure, the resource with the storage size exceeding the preset capacity threshold is extracted in a timed or untimed manner, and the extracted resource is a resource that is newly stored after the last extraction and has the storage size exceeding the preset capacity threshold.

At act 12, link address information of the resource backed up to the cloud server is obtained.

In the act, when the cloud server stores the received resource, a resource folder is set for each uploaded resource, and each resource folder corresponds to link address information of a storage path for storing the resource, i.e., each resource corresponds to one link address. The link address information includes, but is not limited to, a uniform resource locator (URL), IP address information, and hyperText transfer protocol (HTTP) information.

In one or more embodiments of the present disclosure, when the user uploads the resource, the user may select the storage path and the storage folder for the resource, and the cloud server displays the link address information of the storage folder, such that the user may obtain the link address information of the resource. Or the cloud server may return the link address information corresponding to the resource to the electronic device after storing the transmitted resource.

At act 13, a clip processing is performed on the extracted resource, and the link address information corresponding to the extracted resource is encapsulated into the clip-processed resource.

Figure 2:
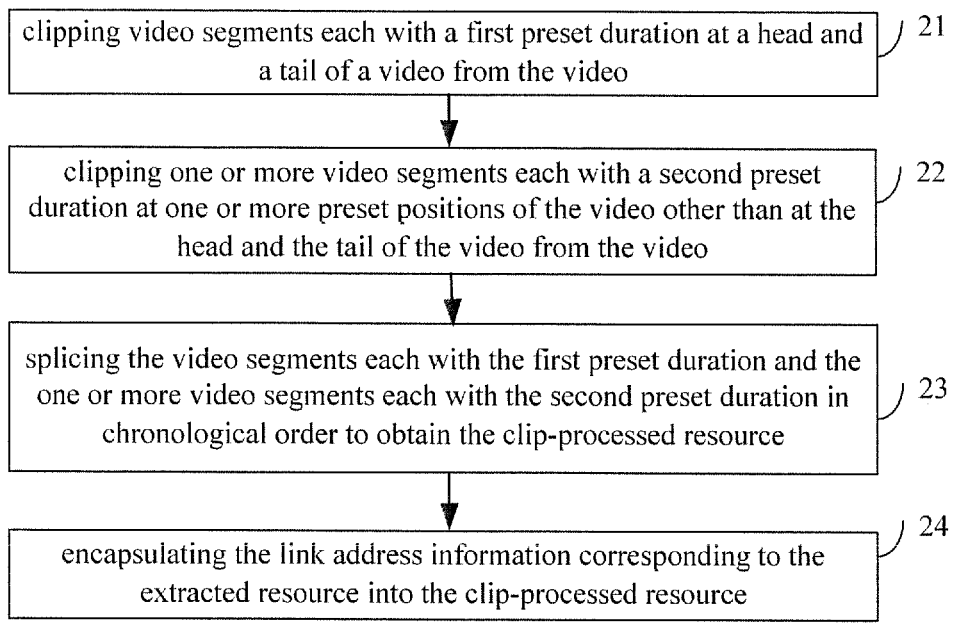
FIG. 2 is a flow chart of performing a clip processing on an extracted resource, and encapsulating link address information corresponding to the extracted resource into a clip-processed resource according to a first embodiment of the present disclosure.

In the act, taking a video as an example, as an alternative or additional embodiment, FIG. 2 is a flow chart of performing a clip processing on an extracted resource, and encapsulating link address information corresponding to the extracted resource into a clip-processed resource according to a first embodiment of the present disclosure. As illustrated in FIG. 2, the flow includes the following.

At act 21, video segments each with a first preset duration is clipped at a head and a tail of a video from the video.

In the act, the first duration may be set according to actual needs, for example, 2 seconds, 5 seconds, or the like. For example, a video segment of 2 seconds starting from the head of the video is clipped, and a video segment of 2 seconds before the tail of the video is clipped.

At act 22, one or more video segments each with a second preset duration is clipped at one or more preset positions of the video other than at the head and the tail of the video from the video.

In the act, as an alternative or additional embodiment, the preset position includes: a position at the quarter of the video, a position at one half of the video, and a position at three quarters of the video. For example, a video segment of 2 seconds starting at the quarter of the video is clipped, a video segment of 2 seconds starting at one half of the video is clipped, and a video segment of 2 seconds starting at three quarters of the video is clipped. As another alternative or additional embodiment, the preset position may also include other locations of the video that are preset, which is not limited by one or more embodiments of the present disclosure.

In one or more embodiments of the present disclosure, the second duration may be set to be equal to the first duration, or different from the first duration.

At act 23, the video segments each with the first preset duration and the one or more video segments each with the second preset duration are spliced in chronological order to obtain the clip-processed resource.

In the act, as described above, the video segment of 2 seconds starting from the head of the video, the video segment of 2 seconds before the tail of the video, the video segment of 2 seconds starting at the quarter of the video, the video segment of 2 seconds starting at one half of the video, and the video segment of 2 seconds starting at three quarters of the video are sequentially spliced to obtain the clip-processed resource. The splicing of the clipped resources is well-known and will not be described in detail herein.

At act 24, the link address information corresponding to the extracted resource is encapsulated into the clip-processed resource.

In the act, as an alternative or additional embodiment, the link address information corresponding to the extracted resource is encapsulated into the clip-processed resource as follows.

A control corresponding to the link address information corresponding to the extracted resource is set at a preset area of a play screen corresponding to the clip-processed resource.

Or, it is set to display the link address information corresponding to the extracted resource in a notification bar or a pop-up window when playing the clip-processed resource.

Figure 3:
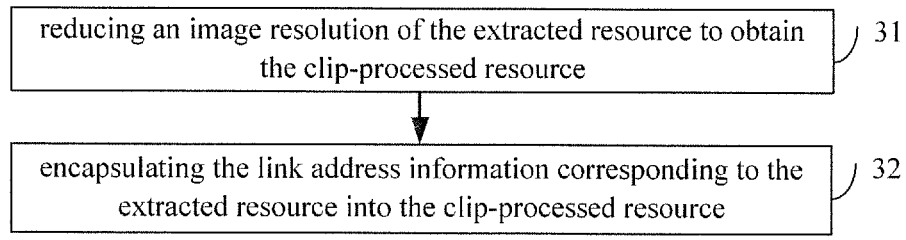
FIG. 3 is a flow chart of performing a clip processing on an extracted resource, and encapsulating link address information corresponding to the extracted resource into a clip-processed resource according to a second embodiment of the present disclosure.

In one or more embodiments of the present disclosure, as another alternative or additional embodiment, FIG. 3 is a flow chart of performing a clip processing on an extracted resource, and encapsulating link address information corresponding to the extracted resource into a clip-processed resource according to a second embodiment of the present disclosure. As illustrated in FIG. 3, the flow includes the following.

At act 31, an image resolution of the extracted resource is reduced to obtain the clip-processed resource.

At act 32, the link address information corresponding to the extracted resource is encapsulated into the clip-processed resource.

In one or more embodiments of the present disclosure, by reducing the image resolution, the storage space required by the resource may be effectively reduced. For example, one pixel may be extracted from every four pixels or three pixels or other multiple pixels in the image of the original resource.

Figure 4:
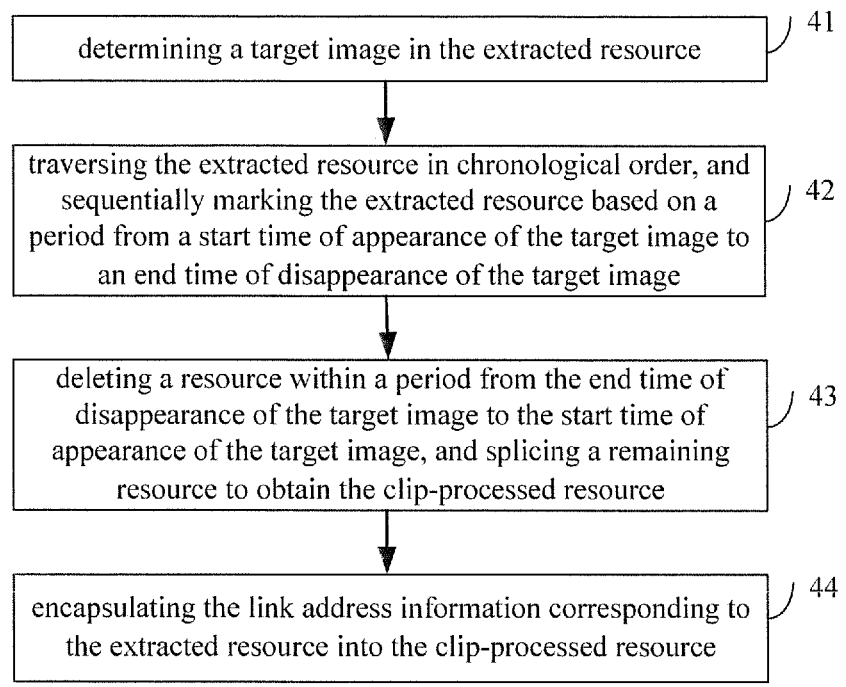
FIG. 4 is a flow chart of performing a clip processing on an extracted resource, and encapsulating link address information corresponding to the extracted resource into a clip-processed resource according to a third embodiment of the present disclosure.

As still another alternative or additional embodiment, FIG. 4 is a flow chart of performing a clip processing on an extracted resource, and encapsulating link address information corresponding to the extracted resource into a clip-processed resource according to a third embodiment of the present disclosure. As illustrated in FIG. 4, the flow includes the following.

At act 41, a target image in the extracted resource is determined.

In the act, the target image may be a person or a thing associated with the user. The target image may be a preset image that is not in the video or an image selected from the played video.

At act 42, the extracted resource is traversed in chronological order, and the extracted resource is sequentially marked based on a period from a start time of appearance of the target image to an end time of disappearance of the target image.

At act 43, a resource within a period from the end time of disappearance of the target image to the start time of appearance of the target image is deleted, and a remaining resource is spliced to obtain the clip-processed resource.

At act 44, the link address information corresponding to the extracted resource is encapsulated into the clip-processed resource.

In one or more embodiments of the present disclosure, the target image may be determined through the user. A time point of appearance of the target image in the extracted video may be recognized and a time point of disappearance of the target image in the extracted video may be recognized by an image recognition and image tracking technology. A time period between the time point of appearance and the time point of disappearance may be an active time period of the target image. By deleting the resource of the time periods other than the active time period of the target image, the storage space required by the resource storage may be effectively reduced. For example, if the total length of a video is 1000 seconds, the marking may be made as follows based on the time point of appearance of the target image and the time point of disappearance of the target image.

Marked as the time point of appearance at 10 seconds and the time point of disappearance at 15 seconds.

Marked as the time point of appearance at 121 seconds and the time point of disappearance at 135 seconds.

Marked as the time point of appearance at 192 seconds and the time point of disappearance at 198 seconds.

Marked as the time point of appearance at 652 seconds and the time point of disappearance at 663 seconds.

Marked as the time point of appearance at 856 seconds and the time point of disappearance at 864 seconds.

Thus, the clipped resources include: a resource fragment from at 10 seconds to at 15 seconds, a resource fragment from at 121 seconds to at 135 seconds, a resource fragment from at 192 seconds to at 198 seconds, a resource fragment from at 652 seconds to at 663 seconds, and a resource fragment from at 856 seconds to at 864 seconds. By splicing each resource segment in sequence, a continuous clip-processed resource may be obtained.

In an embodiment of the present disclosure, as an alternative or additional embodiment, to facilitate the user to identify the clip-processed resource and the resource without the clip processing, the method further includes the following.

The encapsulated resource is marked as a clip processing tag.

In the act, when the stored resource carries a clip processing tag, it indicates that the stored resource is a clip version, and a corresponding full version is stored in the cloud server.

At act 14, the extracted resource stored in an electronic device is replaced with the encapsulated resource.

In the act, the extracted resource (original resource) in the storage directory in the electronic device is deleted, and the encapsulated resource is stored in the storage directory where the original resource is located in the electronic device.

In one or more embodiments of the present disclosure, by retaining the clip-processed resource, on the one hand, the required storage space may be effectively reduced, and on the other hand, the user may know the resource information stored by the cloud server.

In one or more embodiments of the present disclosure, the resource with the storage size exceeding the preset capacity threshold is extracted and the extracted resource is backed up to the cloud server; the link address information of the resource backed up to the cloud server is obtained; the clip processing is performed on the extracted resource and the link address information corresponding to the extracted resource is encapsulated into the clip-processed resource; and the extracted resource stored in the electronic device is replaced with the encapsulated resource. In this way, by backing up the resource to the cloud server, clipping the resource automatically and encapsulating the link address information of storing the resource by the cloud server into the clip-processed resource to replace the corresponding resource stored locally, the storage space required for storing the resource is reduced efficiently and the resource storage efficiency is improved.

In an alternative or additional embodiment, the method further includes the following.

At act 15, a resource playing request is received, and a resource corresponding to the resource playing request is played.

At act 16, an operation from a user on the link address information encapsulated in the played resource is received, and it is jumped to the cloud server mapped by the link address information, and the corresponding resource is read for playing.

In the act, if the clip-processed resource with the tag is currently played, the link address information of the corresponding resource stored in the cloud server is displayed during the playing. For example, in an upper right corner of a play interface, a control button corresponding to the link address information is displayed. If the user needs to browse the complete resource, he may click the control button to jump to the cloud server mapped by the control button, so as to read the stored corresponding resource for playing.

In an alternative or additional embodiment, the method further includes the following.

At act 17, times of reading the corresponding resource for playing is counted, the resource is marked with a download tag in response to the counted times exceeding a preset count, and the corresponding encapsulated resource stored in the electronic device is replaced with the resource marked with the download tag.

In the act, the preset count may be set according to actual needs, for example, 2 times, 3 times, and the like. Taking 2 times as an example, the user may go to the cloud server to play the original resource online. If the number of online playing exceeds 2, it is considered that the user needs to browse the resource frequently and the resource is a resource for the user to operate frequently. Thus, to effectively reduce operations of the user on the link address information encapsulated in the played resource, a copy of the original resource to the local memory may be cached for subsequent playback by the user.

In an embodiment of the present, as an alternative or additional embodiment, the method further includes the following.

The stored resources are traversed to get the resource without a tag.

In the act, no clip processing is performed on the resource with the tag. The tag may include the clip processing tag and the download tag.

As still another alternative or additional embodiment, the method further includes the following.

At act 18, it is determined whether the resource marked with the download tag is played within a preset period; the clip processing is performed on the resource marked with the download tag in response to determining that the resource marked with the download tag is not played within the preset period; the link address information corresponding to the resource marked with the download tag is encapsulated into the clip-processed resource; the resource marked with the download tag stored in the electronic device is replaced with the encapsulated resource.

In the act, if the resource marked with the download tag is played within the preset time period threshold, no processing is performed.

In one or more embodiments of the present disclosure, the time period threshold is set according to actual needs, for example, January, February, and the like. For example, if the original resource is downloaded and cached from the cloud server, i.e., the resource marked with the download tag is not played by the user within 1 month, the cached resource with the download tag is automatically replaced with the clip-processed resource.

Figure 5:
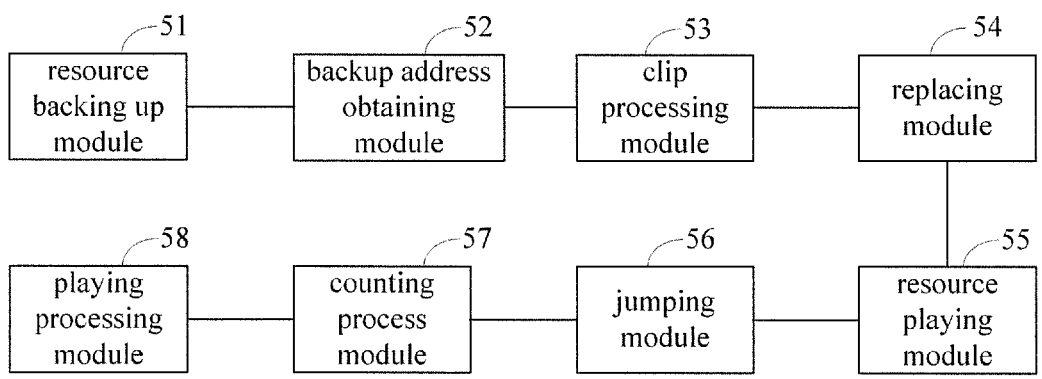
FIG. 5 is a block diagram of an apparatus for storing a resource according to an embodiment of the present disclosure.

FIG. 5 is a block diagram of an apparatus for storing a resource according to an embodiment of the present disclosure. As illustrated in FIG. 5, the apparatus includes a resource backing up module 51, a backup address obtaining module 52, a clip processing module 53 and a replacing module 54.

The resource backing up module 51 is configured to extract a resource with a storage size exceeding a preset capacity threshold, and to back up the extracted resource to a cloud server.

In one or more embodiments of the present disclosure, the resources may include, but be not limited to, pictures, audios, videos, texts, and the like. The picture format may be a BMP format, or a JPEG format, or a GIF. The video format may be a RM format, or an AVI format, which is not limited in one or more embodiments of the present disclosure.

In an embodiment of the present disclosure, as an alternative or additional embodiment, to enhance the security of the resource storage in the cloud server, and to prevent the resource from being illegally accessed, the following may be included after the extracted resource is backed up to a cloud server.

The extracted resource is encrypted.

As another alternative or additional embodiment, to enhance the security during the resource transmission, the resource backing up module 51 is configured to transmit the extracted resource using a SSL protocol.

The backup address obtaining module 52 is configured to obtain link address information of the resource backed up to the cloud server.

In one or more embodiments of the present disclosure, when the cloud server stores the received resource, a resource folder is set for each uploaded resource, and each resource folder corresponds to link address information of a storage path for storing the resource, i.e., each resource corresponds to one link address. The link address information includes, but is not limited to, a URL, IP address information, and HTTP information.

The clip processing module 53 is configured to perform a clip processing on the extracted resource, and to encapsulate the link address information corresponding to the extracted resource into the clip-processed resource.

In an embodiment of the present disclosure, as an alternative or additional embodiment, the clip processing module 53 includes a first clipping unit, a second clipping unit, a first splicing unit and a first encapsulating unit (not illustrated in Figs.).

The first clipping unit is configured to clip video segments each with a first preset duration at a head and a tail of a video from the video.

The second clipping unit is configured to clip one or more video segments each with a second preset duration at one or more preset positions of the video other than at the head and the tail of the video from the video.

In an embodiment of the present disclosure, as an alternative or additional embodiment, the preset position includes: a position at the quarter of the video, a position at one half of the video, and a position at three quarters of the video.

The first splicing unit is configured to splice the video segments each with the first preset duration and the one or more video segments each with the second preset duration in chronological order to obtain the clip-processed resource.

The first encapsulating unit is configured to encapsulate the link address information corresponding to the extracted resource into the clip-processed resource.

As another alternative or additional embodiment, the clip processing module 53 includes a resolution processing unit and a second encapsulating unit.

The resolution processing unit is configured to reduce an image resolution of the extracted resource to obtain the clip-processed resource.

The second encapsulating unit is configured to encapsulate the link address information corresponding to the extracted resource into the clip-processed resource.

As still another alternative or additional embodiment, the clip processing module 53 includes a target image determining unit, a marking unit, a second splicing unit and a third encapsulating unit.

The target image determining unit is configured to determine a target image in the extracted resource.

In one or more embodiments of the present disclosure, the target image may be a person or a thing associated with the user. The target image may be a preset image that is not in the video or an image selected from the played video.

The marking unit is configured to traverse the extracted resource in chronological order, and to sequentially mark the extracted resource based on a period from a start time of appearance of the target image to an end time of disappearance of the target image.

The second splicing unit is configured to delete a resource within a period from the end time of disappearance of the target image to the start time of appearance of the target image, and to splice a remaining resource to obtain the clip-processed resource.

The third encapsulating unit is configured to encapsulate the link address information corresponding to the extracted resource into the clip-processed resource.

In an embodiment of the present disclosure, as an alternative or additional embodiment, the link address information corresponding to the extracted resource is encapsulated into the clip-processed resource as follows.

A control corresponding to the link address information corresponding to the extracted resource is set at a preset area of a play screen corresponding to the clip-processed resource.

As another alternative or additional embodiment, the link address information corresponding to the extracted resource is encapsulated into the clip-processed resource as follows.

It is set to display the link address information corresponding to the extracted resource in a notification bar or a pop-up window when playing the clip-processed resource.

In an embodiment of the present disclosure, as an alternative or additional embodiment, the clip processing module 53 is further configured to mark the encapsulated resource as a clip processing tag.

The replacing module 54 is configured to replace the extracted resource stored in an electronic device with the encapsulated resource.

In one or more embodiments of the present disclosure, the extracted resource (original resource) in the storage directory in the electronic device is deleted, and the encapsulated resource is stored in the storage directory where the original resource is located in the electronic device.

In one or more embodiments of the present disclosure, by retaining the clip-processed resource, on the one hand, the required storage space may be effectively reduced, and on the other hand, the user may know the resource information stored by the cloud server.

In an embodiment of the present disclosure, as an alternative or additional embodiment, the apparatus further includes a resource playing module 55 and a jumping module 56.

The resource playing module 55 is configured to receive a resource playing request and to play a resource corresponding to the resource playing request.

The jumping module 56 is configured to receive an operation from a user on the link address information encapsulated in the played resource, to jump to the cloud server mapped by the link address information, and to read the corresponding resource for playing.

In an embodiment of the present disclosure, as an alternative or additional embodiment, the apparatus further includes a counting process module 57.

The counting process module 57 is configured to count times of reading the corresponding resource for playing, and to download the resource mapped by the link address information and mark the resource with a download tag in response to the counted times exceeding a preset count, and to replace the corresponding encapsulated resource stored in the electronic device with the resource marked with the download tag.

In an embodiment of the present disclosure, as an alternative or additional embodiment, the resource backing up module 51 is configured to traverse the stored resources to get the resource without a tag and perform the clip processing on the resource without the tag.

In an embodiment of the present disclosure, the tag may include the clip processing tag and the download tag.

In an embodiment of the present disclosure, as another alternative or additional embodiment, the apparatus further includes a playing processing module 58.

The playing processing module 58 is configured to determine whether the resource marked with the download tag is played within a preset period, and to perform the clip processing on the resource marked with the download tag in response to determining that the resource marked with the download tag is not played within the preset period, and to encapsulate the link address information corresponding to the resource marked with the download tag into the clip-processed resource, and to replace the resource marked with the download tag stored in the electronic device with the encapsulated resource.

In an embodiment of the present disclosure, if the resource marked with the download tag is played within the preset time period threshold, no processing is performed.

Embodiments of the present disclosure also provide an electronic device. The electronic device includes the apparatus in any embodiment described above.

Figure 6:
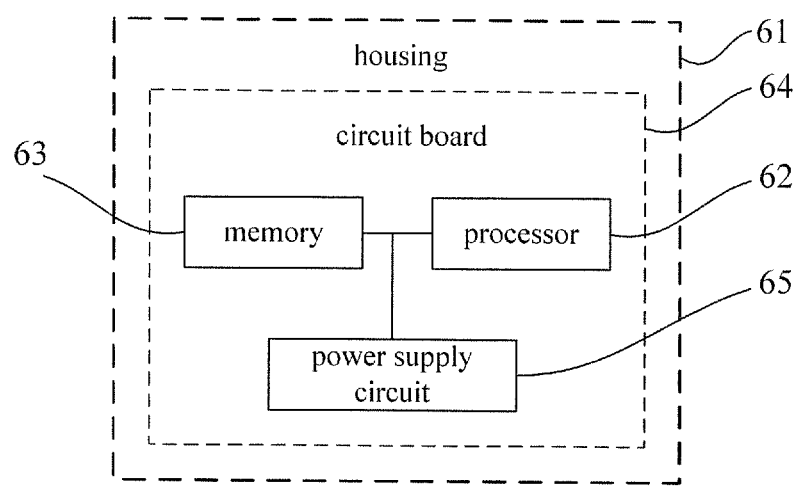
FIG. 6 is a block diagram of an electronic device according to an embodiment of the present disclosure.

FIG. 6 is a block diagram of an electronic device according to an embodiment of the present disclosure. The electronic device may be configured to implement the flows of the embodiments illustrated in FIGS. 1-5. The electronic device may include a housing 61, a processor 62, a memory 63, a circuit board 64 and a power supply circuit 65. The circuit board 64 is disposed inside a space enclosed by the housing 61, and the processor 62 and the memory 63 are disposed in the circuit board 64; the power supply circuit 65 is configured to supply power to each circuit or device of the electronic device; the memory 63 is configured to store executable program codes; the processor 62 is configured to execute programs corresponding to the executable program codes by reading the executable program codes stored in the memory 63 to implement the following acts:

extracting a resource with a storage size exceeding a preset capacity threshold, and backing up the extracted resource to a cloud server;

obtaining link address information of the resource backed up to the cloud server;

performing a clip processing on the extracted resource, and encapsulating the link address information corresponding to the extracted resource into the clip-processed resource; and replacing the extracted resource stored in an electronic device with the encapsulated resource.

Detail processes of the above acts executed by the processor 62 and detail processes of running program codes to execute further acts by the processor 62 may be referred to above descriptions of embodiments illustrated in FIGS. 1 to 5, which are not elaborated herein.

The electronic device may have various forms, including but not limited to:

(1) A mobile communication device: this typed device has a capacity of mobile communicating, and has a main function of providing voice, data communication. This typed device includes a smart phone (such as an iPhone), a multi-media phone, a functional phone and a low-level phone.

(2) A super-mobile personal computer device: this typed device pertains to a personal computer having a capacity of computing and processing and generally having a capacity of accessing mobile Internet. This typed device includes: PDA (Personal Digital Assistant), MID (Mobile Internet Device) and UMPC (Ultra-mobile Personal Computer) devices, such as an iPad.

(3) Portable entertainment equipment: this typed device may display or play multi-medium content. This typed device includes: an audio, video player (such as iPod), a handheld game player, an E-book, intelligent playthings, and portable vehicle navigation equipment.

(4) A server: a device for providing a calculation service. The server may include a processor, a hard disk, a memory, system buses and the like. The structure of the server is similar to that of computer. As it needs to provide a highly reliable service, there is a high requirement to a processing capability, stability, reliance, security, scalability, manageability.

(5) Other electronic device having a capacity of data interaction.

Embodiments of the present disclosure further provide a storage medium. The storage medium is configured to store an application. The application is configured to implement a method for storing a resource provided in embodiments of the present disclosure.

Embodiments of the present disclosure further provide an application. The application is configured to implement a method for storing a resource provided in embodiments of the present disclosure.

It should be noted that, regarding the foregoing method embodiments, for the sake of simple description, they are all expressed as combinations of a series of acts, but those skilled in the art should understand that the present disclosure is not limited by the described act sequences since certain acts may be performed in other sequences or concurrently in accordance with the present disclosure. Secondly, those skilled in the art should also understand that the embodiments described in the specification are all preferred embodiments, and the acts and modules involved are not necessarily required by the present disclosure.

In the above embodiments, the descriptions of the various embodiments are all different, and the parts that are not detailed in a certain embodiment may be referred to the related descriptions of other embodiments.

In the several embodiments provided herein, it should be understood that the disclosed apparatus may be implemented in other ways. For example, the apparatus embodiments described above are schematic, for example, the division of the units is only a logical function division, and the actual implementation may have another division manner, such as, a plurality of units or components may be combined or may be integrated to another system, or some features may be ignored or not executed. In addition, the mutual coupling or direct coupling or communication connection illustrated or discussed may be through some interfaces. The indirect coupling or communication connection among devices or units may be electrical or otherwise.

The units described as separate components may or may not be physically separated, and the components displayed as units may or may not be physical units. That is, they may be located in one place, or may be distributed to multiple network units. Some or all of the units may be selected according to actual needs to achieve the purpose of the solutions of the embodiments.

In addition, individual functional units in the embodiments of the present disclosure may be integrated in one processing unit or may be separately physically present, or two or more units may be integrated in one unit. The integrated unit as described above may be achieved in the form of hardware, or may be achieved in the form of a software functional module.

If the integrated unit is achieved in the form of a software functional module and sold or used as a separate product, the integrated unit may also be stored in a computer readable storage medium. Based on such understanding, the technical solution of the present disclosure, in essence, or a part of contributing to the prior art or all or part of the technical solution may be embodied in the form of a software product stored in a storage medium. A number of instructions are included to cause a computer device (which may be a personal computer, server or network device, etc.) to perform all or part of the acts of the methods described in various embodiments of the present disclosure. The foregoing storage medium includes: a U disk, a Read-Only Memory (ROM), a Random Access Memory (RAM), a removable hard disk, a magnetic disk, or an optical disk, and the like.

The above are only some specific embodiments of the present disclosure, but the scope of the present disclosure is not limited thereto. Those skilled in the art may easily have changes and alternatives within the technical scope of the present disclosure. All should be covered by the scope of the present disclosure. Therefore, the scope of the disclosure should be determined by the scope of the claims.

What is claimed is:

1. A method for storing a resource, comprising:

extracting a resource with a storage size exceeding a preset capacity threshold, and backing up the extracted resource to a cloud server;

obtaining link address information of the resource backed up to the cloud server;

performing a clip processing on the extracted resource, and encapsulating the link address information corresponding to the extracted resource into the clip-processed resource; and replacing the extracted resource stored in an electronic device with the encapsulated resource, wherein performing the clip processing on the extracted resource and encapsulating the link address information corresponding to the extracted resource into the clip-processed resource, comprises:
clipping video segments each with a first preset duration at a head and a tail of a video from the video, clipping one or more video segments each with a second preset duration at one or more preset positions of the video other than at the head and the tail of the video from the video, splicing the video segments each with the first preset duration and the one or more video segments each with the second preset duration in chronological order to obtain the clip-processed resource, and encapsulating the link address information corresponding to the extracted resource into the clip-processed resource;
wherein performing the clip processing on the extracted resource and encapsulating the link address information corresponding to the extracted resource into the clip-processed resource, comprises: determining a target image in the extracted resource, traversing the extracted resource in chronological order, sequentially marking the extracted resource based on a period from a start time of appearance of the target image to an end time of disappearance of the target image, deleting a resource within a period from the end time of disappearance of the target image to the start time of appearance of the target image, splicing a remaining resource to obtain the clip-processed resource, and encapsulating the link address information corresponding to the extracted resource into the clip-processed resource.

2. The method of claim 1, wherein, encapsulating the link address information corresponding to the extracted resource into the clip-processed resource, comprises:
setting a control corresponding to the link address information corresponding to the extracted resource at a preset area of a play screen corresponding to the clip-processed resource.

3. The method of claim 1, wherein, encapsulating the link address information corresponding to the extracted resource into the clip-processed resource, comprises:
setting to display the link address information corresponding to the extracted resource in a notification bar or a pop-up window when playing the clip-processed resource.

4. The method of claim 1, further comprising:
receiving a resource playing request, playing a resource corresponding to the resource playing request;
receiving an operation from a user on the link address information encapsulated in the played resource, jumping to the cloud server mapped by the link address information, and reading the corresponding resource for playing.

5. The method of claim 4, further comprising:
counting times of reading the corresponding resource for playing, and downloading the resource mapped by the link address information and marking the resource with a download tag in response to the counted times exceeding a preset count, and replacing the corresponding encapsulated resource stored in the electronic device with the resource marked with the download tag.

6. The method of claim 5, further comprising:
determining whether the resource marked with the download tag is played within a preset period;
performing the clip processing on the resource marked with the download tag in response to determining that the resource marked with the download tag is not played within the preset period, and encapsulating the link address information corresponding to the resource marked with the download tag into the clip-processed resource, and replacing the resource marked with the download tag stored in the electronic device with the encapsulated resource.

7. The method of claim 1, wherein, performing the clip processing on the extracted resource and encapsulating the link address information corresponding to the extracted resource into the clip-processed resource, comprises:
reducing an image resolution of the extracted resource to obtain the clip-processed resource, and encapsulating the link address information corresponding to the extracted resource into the clip-processed resource.

8. An electronic device, comprising a housing, a processor, a memory, a circuit board and a power supply circuit, wherein the circuit board is disposed inside a space enclosed by the housing, and the processor and the memory are disposed in the circuit board; the power supply circuit is configured to supply power to each circuit or device of the electronic device; the memory is configured to store executable program codes; the processor is configured to execute programs corresponding to the executable program codes by reading the executable program codes stored in the memory to implement acts:
extracting a resource with a storage size exceeding a preset capacity threshold, and backing up the extracted resource to a cloud server;
obtaining link address information of the resource backed up to the cloud server;
performing a clip processing on the extracted resource, and encapsulating the link address information corresponding to the extracted resource into the clip-processed resource; and
replacing the extracted resource stored in an electronic device with the encapsulated resource,
wherein performing the clip processing on the extracted resource and encapsulating the link address information corresponding to the extracted resource into the clip-processed resource, comprises:
clipping video segments each with a first preset duration at a head and a tail of a video from the video, clipping one or more video segments each with a second preset duration at one or more preset positions of the video other than at the head and the tail of the video from the video, splicing the video segments each with the first preset duration and the one or more video segments each with the second preset duration in chronological order to obtain the clip-processed resource, and encapsulating the link address information corresponding to the extracted resource into the clip-processed resource;
wherein performing the clip processing on the extracted resource and encapsulating the link address information corresponding to the extracted resource into the clip-processed resource, comprises: determining a target image in the extracted resource, traversing the extracted resource in chronological order, sequentially marking the extracted resource based on a period from a start time of appearance of the target image to an end time of disappearance of the target image, deleting a resource within a period from the end time of disappearance of the target image to the start time of appearance of the target image, splicing a remaining resource to obtain the clip-processed resource, and encapsulating the link address information corresponding to the extracted resource into the clip-processed resource.

9. The electronic device of claim 8, wherein, encapsulating the link address information corresponding to the extracted resource into the clip-processed resource, comprises:
setting a control corresponding to the link address information corresponding to the extracted resource at a preset area of a play screen corresponding to the clip-processed resource.

10. The electronic device of claim 8, wherein, encapsulating the link address information corresponding to the extracted resource into the clip-processed resource, comprises:
setting to display the link address information corresponding to the extracted resource in a notification bar or a pop-up window when playing the clip-processed resource.

11. The electronic device of claim 8, wherein, the processor is further configured to execute programs corresponding to the executable program codes by reading the executable program codes stored in the memory to implement acts:
receiving a resource playing request, playing a resource corresponding to the resource playing request;
receiving an operation from a user on the link address information encapsulated in the played resource, jumping to the cloud server mapped by the link address information, and reading the corresponding resource for playing.

12. The electronic device of claim 11, wherein, the processor is further configured to execute programs corresponding to the executable program codes by reading the executable program codes stored in the memory to implement acts:
counting times of reading the corresponding resource for playing, and downloading the resource mapped by the link address information and marking the resource with a download tag in response to the counted times exceeding a preset count, and replacing the corresponding encapsulated resource stored in the electronic device with the resource marked with the download tag.

13. The electronic device of claim 12, wherein, the processor is further configured to execute programs corresponding to the executable program codes by reading the executable program codes stored in the memory to implement acts:
determining whether the resource marked with the download tag is played within a preset period;
performing the clip processing on the resource marked with the download tag in response to determining that the resource marked with the download tag is not played within the preset period, and encapsulating the link address information corresponding to the resource marked with the download tag into the clip-processed resource, and replacing the resource marked with the download tag stored in the electronic device with the encapsulated resource.

14. A non-transitory storage medium comprising computer instructions that, when executed, causes an electronic device to implement acts:
extracting a resource with a storage size exceeding a preset capacity threshold, and backing up the extracted resource to a cloud server;
obtaining link address information of the resource backed up to the cloud server;
performing a clip processing on the extracted resource, and encapsulating the link address information corresponding to the extracted resource into the clip-processed resource; and
replacing the extracted resource stored in an electronic device with the encapsulated resource,
wherein performing the clip processing on the extracted resource and encapsulating the link address information corresponding to the extracted resource into the clip-processed resource, comprises:
clipping video segments each with a first preset duration at a head and a tail of a video from the video, clipping one or more video segments each with a second preset duration at one or more preset positions of the video other than at the head and the tail of the video from the video, splicing the video segments each with the first preset duration and the one or more video segments each with the second preset duration in chronological order to obtain the clip-processed resource, and encapsulating the link address information corresponding to the extracted resource into the clip-processed resource;
wherein performing the clip processing on the extracted resource and encapsulating the link address information corresponding to the extracted resource into the clip-processed resource, comprises: determining a target image in the extracted resource, traversing the extracted resource in chronological order, sequentially marking the extracted resource based on a period from a start time of appearance of the target image to an end time of disappearance of the target image, deleting a resource within a period from the end time of disappearance of the target image to the start time of appearance of the target image, splicing a remaining resource to obtain the clip-processed resource, and encapsulating the link address information corresponding to the extracted resource into the clip-processed resource.

15. The storage medium of claim 14, wherein, encapsulating the link address information corresponding to the extracted resource into the clip-processed resource, comprises:
setting a control corresponding to the link address information corresponding to the extracted resource at a preset area of a play screen corresponding to the clip-processed resource.

16. The storage medium of claim 14, wherein, encapsulating the link address information corresponding to the extracted resource into the clip-processed resource, comprises:
setting to display the link address information corresponding to the extracted resource in a notification bar or a pop-up window when playing the clip-processed resource.

17. The storage medium of claim 14, wherein the instructions further include acts:
receiving a resource playing request, playing a resource corresponding to the resource playing request;
receiving an operation from a user on the link address information encapsulated in the played resource, jumping to the cloud server mapped by the link address information, and reading the corresponding resource for playing.

18. The storage medium of claim 17, wherein the instructions further include acts:
counting times of reading the corresponding resource for playing, and downloading the resource mapped by the link address information and marking the resource with a download tag in response to the counted times exceeding a preset count, and replacing the corresponding encapsulated resource stored in the electronic device with the resource marked with the download tag.

19. The storage medium of claim 18, wherein the instructions further include acts:

determining whether the resource marked with the download tag is played within a preset period;

performing the clip processing on the resource marked with the download tag in response to determining that the resource marked with the download tag is not played within the preset period, and encapsulating the link address information corresponding to the resource marked with the download tag into the clip-processed resource, and replacing the resource marked with the download tag stored in the electronic device with the encapsulated resource.

* * * * *